United States Patent Office 2,883,364
Patented Apr. 21, 1959

2,883,364

STABILIZATION OF RUBBER WITH RESINOUS BIS-CRESOLS

Roger A. Mathes, Akron, Ohio, assignor to The B. F. Goodrich Company, New York, N.Y., a corporation of New York No Drawing. Application March 1, 1955
Serial No. 491,523

8 Claims. (Cl. 260—45.95)

This invention relates to non-staining antioxidants and more particularly to a new class of chemical reaction products which are highly effective deterioration retarders and which possess excellent non-staining and non-discoloring properties when used in light-colored and white rubber products.

In the commercial manufacture of vulcanized rubber products, it is necessary to include in the formulation compounds which render the vulcanized rubber products resistant to deterioration by the action of oxygen, otherwise vulcanized rubber products develop altered and undesirable properties after exposure to oxygen over a period of time. The rate of deterioration is dependent upon the oxygen content of the atmosphere in which such products are exposed, the temperature, the pressure, the presence of sunlight, and the like.

It has previously been the practice in the manufacture of rubber products to add to the rubber composition before vulcanization antioxidants of the diarylamine and like types. However, these antioxidants, while effective, unfortunately stain and discolor light-colored rubber compositions, particularly on exposure to sunlight, and hence are not suitable for use in light-colored and white vulcanized rubber products.

It has heretofore been proposed to utilize various phenolic compounds as deterioration retarders for light-colored rubber products. While some of these do have the desirable property of not causing serious discoloration on exposure to sunlight, their antioxidant activity is relatively weak, as compared with the diarylamine antioxidants in general use.

There is consequently a need for a suitable deterioration retarder for inclusion in rubber formulations, from which white and light-colored vulcanized rubber products are made, of compounds capable of protecting the vulcanized rubber product from deterioration in the presence of oxygen and at the same time not to produce undesirable discoloration as such a rubber product ages in light. It is to a new class of chemical condensation products which have both of these desirable properties that this application is directed.

The term "rubbery diolefinic polymer" is employed in this application in a broad generic sense to include all natural and synthetic rubbery diolefinic polymers, including the various natural rubbers which are regarded as naturally-occurring isoprene polymers, and such synthetic rubbers as polymers of conjugated dienes, such as butadiene-1,3, isoprene, piperylene, 2,3-dimethyl butadiene-1,3, and other butadiene-1,3 hydrocarbons, chloroprene, cyano butadiene-1,3, etc., as well as copolymers of these conjugated dienes with each other or with other mono-olefinic compounds copolymerizable therewith, such as styrene, chlorostyrene, isobutylene, acrylonitrile, methacrylonitrile, acrylic and methacrylic acids, alkyl acrylates and methacrylates, vinylidene chloride, vinyl pyridine, etc.

I have discovered a new class of condensation products, not heretofore known, which have excellent antioxidant properties and which are produced by the interaction of what is here termed a "bis-o-cresol alkane" with a ketone to form solid resinous materials which are excellent deterioration retarders and which tests indicate to be a condensation product in the nature of a polymer of the bis-o-cresol alkane and the ketone, commonly known as a polycondensation product, which is represented by the generic formula

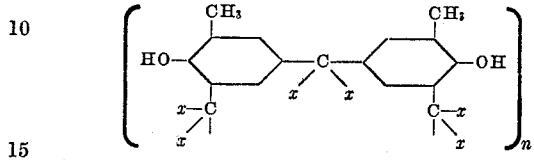

wherein $n$ is 2 or more and each

group represents a bivalent saturated hydrocarbon radical selected from a class consisting of (a) a bivalent alkane group in which each $x$ is an alkyl radical and the total number of carbon atoms in said group ranges from 3 to 10, and (b) a bivalent cycloalkane group in which the carbon atom and each $x$ is a constituent of the cycloalkane group, and in which the total number of carbon atoms ranges from 4 to 12 carbon atoms. The term "alkane" is herein sometimes used in a generic sense to include alkane and cycloalkane groupings in which each of the two free valences on one carbon atom is attached to a different phenyl ring in a position para to the OH group, so as to bridge the two o-cresol rings to form a bis-o-cresol alkane.

The bis-o-cresol alkanes from which the novel resin deterioration retarders of this invention are produced have the generic formula

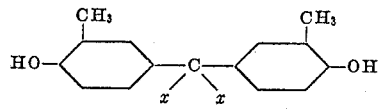

wherein the

group, bridging the phenyl groups, herein referred to as the bridging alkane group, such bis-o-cresol alkanes including, by way of example, 2,2-bis(3-methyl-4-hydroxy phenyl) propane and other similar alkanes; 1,1-bis(3-methyl-4-hydroxy phenyl)cyclohexane and other similar cycloalkanes, in which the alkane group is a bivalent hydrocarbon group, which may be considered as derived by removing two hydrogen atoms from the same carbon atom of such hydrocarbons as propane, butanes, pentanes, hexanes, heptanes, octanes, nonanes, decanes, and similar alkanes, whether straight chain or branched, as well as cyclobutane, cyclopentane, cyclohexane, cycloheptane, cyclooctane, cyclononane, cyclodecane, methyl cyclopentane, methyl cyclohexane, ethyl cyclohexane and the like.

The ketones which are reacted with the bis-o-cresol alkanes to produce the resinous deterioration retarders of this application are of the general formula

wherein the

group is a bivalent satuarted hydrocarbon radical of the scope hereinabove defined. The ketones such as acetone, methyl ethyl ketone, diethyl ketone, methyl n-propyl ketone, methyl isopropyl ketone, ethyl n-propyl ketone, ethyl isopropyl ketone, methyl n-butyl ketone, methyl isobutyl ketone, methyl t-butyl ketone and the like, as well as aromatic ketones such as phenyl ethyl ketone, methyl phenyl ethyl ketone, ethyl phenyl ethyl ketone and the like, and the ketones having saturated cyclic hydrocarbon groups include such saturated alicyclic ketones as cyclopentanone, cyclohexanone, cycloheptanone, cyclooctanone, cyclodecanone, and cyclic ketones of the generic formula

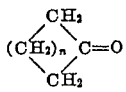

as well as the alkyl-substituted saturated cyclic ketones, such as methyl cyclopentyl ketone, ethyl cyclopentyl ketone, methyl cyclopentanone, ethyl cyclopentanone, methyl cyclohexyl ketone, ethyl cyclohexyl ketone and the like.

The preparation of the bis-o-cresol alkanes forms no part of this invention. In passing, it may be stated that when o-cresol and a ketone having 3 or more carbon atoms are brought into intimate contact in the presence of an acid-reacting condensing agent, with or without an acid catalyst, the two readily react to form a bis-o-cresol alkane which has the generic formula

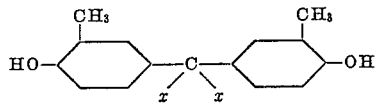

wherein the

group represents either an alkylidene hydrocarbon group having 3 or more carbon atoms, or a saturated cyclic hydrocarbon group having 4 or more carbon atoms.

The condensation of the bis-o-cresol alkane and the ketone is generally carried out in the presence of an acid-reacting condensation agent, such as sulfuric acid, hydrochloric acid, anhydrous hydrogen chloride, aluminum chloride, calcium chloride and the like. The condensation reactions carried out in this manner are often slow and improved results are usually obtained by using as a catalyst a mercapto-substituted aliphatic monocarboxylic acid, such as beta-mercaptopropionic acid. When a catalyst is used, the amount employed may be varied widely, but the preferred amount is generally in the range of from about 0.5 to 10 weight percent of the reactants.

In carrying out the reaction, the reactants, the acid-condensing agent and the catalyst are mixed together in any desired order. In general, it is most convenient to mix the bis-o-cresol alkane and the ketone and then to add the condensing agent and the catalyst, if the latter is used. If both of the reactants are solids, an inert organic diluent or solvent is preferably added with the reactants. Examples of solvents and diluents useful in the condensation reaction include glacial acetic acid, benzene, hexane, chlorobenzene, gasoline and other unreactive organic liquids. If the mixed reactants form a liquid system, the presence of the solvent or diluent is not essential, although a diluent may be used where desirable. The reaction temperature is not critical and the reaction may be carried out at room temperature. However, experience has shown that temperatures from 50° to 70° C. give in many cases more satisfactory reaction rates.

The amount of the two reactants may also be varied. However, experience has shown that the resulting resinous condensation product indicates substantially a 1 to 1 ratio of the reactants in the end condensation product, and that an excess of ketone is normally desirable.

The amount of the condensation product which may be employed as a deterioration retarder in rubber ranges from about 0.1 to about 10 weight percent based on the rubber, whereas to obtain a maximum value of the condensation product as a non-discoloring, non-staining deterioration retarder, an amount ranging from about 0.5 to 5 weight percent will generally give adequate protection. Commonly 1 weight percent on the rubber is employed.

The non-staining deterioration retarders of this application can be readily admixed with rubber and rubber compositions at any stage subsequent to polymerization. For example, they may be admixed into rubber and rubber compositions at the same time and in the same manner that vulcanizing, accelerating and other compounding ingredients are added, which is a preferred way for incorporating non-staining, non-discoloring deterioration retarders into natural crude rubber and results in the deterioration retarder being uniformly dispersed throughout the rubber composition. In the case of synthetic rubbers, which are ordinarily prepared by polymerization in an aqueous medium, it is advantageous to add the deterioration retarder in an aqueous dispersion or emulsion to the synthetic rubber latex as it comes from the polymerizer. In this way, when the synthetic rubber is recovered from the latex by coagulation, the non-staining, non-discoloring deterioration retarder is already uniformly distributed throughout the mass of the synthetic rubber, so that the rubber is protected against deterioration from the time it is made until it is compounded for use. This makes it unnecessary to add an antioxidant during the compounding of the rubber, although more of the non-staining, non-discoloring deterioration retarder can be added with the other compounding ingredients in the event any specific rubber composition may indicate such a course to be desirable.

The preparation of the bis-o-cresol alkane-ketone condensation products and the use of the same in rubber compositions is more fully set forth in the following examples which are to be understood to be illustrative only since numerous modifications and variations thereof will be apparent to those skilled in the art.

EXAMPLE I

A reaction flask was charged with 38.4 g. (0.15 mol) of 2,2-bis(3-methyl-4-hydroxy phenyl)propane, 17.4 g. (0.3 mol) of acetone, 150 cc. concentrated hydrochloric acid (37% HCl) and 4 g. β-mercaptopropionic acid, and while stirring the mixture heated to 56° C., and that temperature maintained for about 3 hours. During this period, a solid was formed, the particles of which increased in size to that of large pellets. The liquids were decanted off, and the product washed several times by decantation to remove residual acid. The dry weight of the hard, brittle resinous product was 42.5 g. It melted in the range 113–120° C. Analysis indicated a product of the formula:

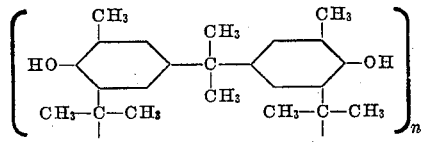

The resinous condensation product of the above example was tested for antioxidant properties in the following tire tread recipe:

| Ingredients: | Parts by weight |
| --- | --- |
| Natural rubber | 100.0 |
| Channel black (EP) | 50.0 |
| Zinc oxide | 5.0 |
| Stearic acid | 3.0 |
| Sulfur | 3.0 |
| Accelerator (benzothiazyl disulfide) | 1.0 |
| Reaction product of Example I | 1.0 |

A blank without deterioration retarder, but otherwise having the same ingredients as in the above recipe, and a standard stock having 1 part of phenyl β-naphthylamine replacing the 1 part of the reaction product of Example I, were compounded and cured for comparison purposes. Each of the three compounded rubber stocks was cured in a steam press at 280° F. for 60 and 80 minutes.

The aging tests followed the standard ASTM procedure (D865–48T). Test dumbbell strips were cut from each of the vulcanized rubber stocks and aged in open test tubes for 24 and 48 hours at 212° F. The following test results were obtained:

Table I.—Aging of rubber stocks

|  | Percentage of Original Tensile Strength Retained After Aging at 212° F. | | | |
|---|---|---|---|---|
|  | 24 Hours' Aging | | 48 Hours' Aging | |
|  | 60″ Cure | 80″ Cure | 60″ Cure | 80″ Cure |
| Condensation Product—Example I... | 83 | 79 | 65 | 55 |
| Blank—No Antioxidant............... | 52 | 52 | 29 | 30 |
| Control—phenyl β-naphthylamine... | 75 | 74 | 53 | 51 |

It is seen from the above that the age-resisting properties of the product of Example I are superior to those of phenyl β-naphthylamine, the presently most widely used antioxidant.

*Example II*

A reaction flask was charged with about 25.6 g. (0.1 mol) of 2,2-bis(3-methyl-4-hydroxy phenyl)propane, about 11 g. (0.11 mol) of cyclohexanone, 125 cc. of concentrated hydrochloric acid, and 1 g. of β-mercaptopropionic acid. The mixture was stirred for about 2.5 hours at room temperature (26 to 28° C.). During this period, a precipitate was observed to form in the reaction mixture, the latter changing to a yellow color, and the precipitated particles to increase in size. The reaction mixture was filtered to separate out the solids, which were washed free of acid and dried, yielding 32.4 g. of a coarse-particled, light buff-colored resinous material. Analysis indicated a reaction product of the formula:

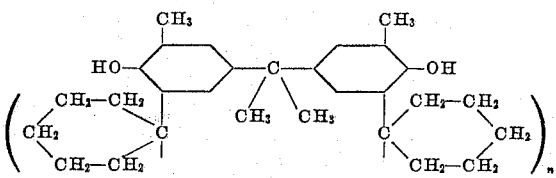

The resinous condensation product of Example II was tested for age-resisting properties in the standard tire tread recipe above set forth and the tests followed the identical procedure described in connection with Example I. The following test results were obtained:

Table II.—Aging of rubber stocks

|  | Percentage of Original Tensile Strength Retained After Aging at 212° F. | | | |
|---|---|---|---|---|
|  | 24 Hours' Aging | | 48 Hours' Aging | |
|  | 60″ Cure | 80″ Cure | 60″ Cure | 80″ Cure |
| Reaction Product—Example I....... | 95 | 88 | 75 | 62 |
| Blank—No Antioxidant............... | 68 | 66 | 39 | 45 |
| Control—phenyl β-naphthylamine... | 87 | 85 | 65 | 55 |

The above tests clearly indicate that the age-resisting properties of the condensation product of Example II are far superior to those of phenyl β-naphthylamine, the presently most widely used antioxidant in tire tread stocks.

The condensation products of Examples I and II were tested for discoloring and staining in the following standard white sidewall rubber composition:

Ingredients: Parts by weight
Natural rubber _____ 100.0
Zinc oxide _____ 85.0
Titanium dioxide _____ 15.0
Ultramarine blue _____ 0.2
Stearic acid _____ 1.0
Sulfur _____ 3.0
Accelerator–Hepteen base _____ 0.3
Antioxidant _____ 1.0

Using the above recipe, 4 identical stocks were compounded and vulcanized for comparison purposes with the following exceptions: one stock contained the condensation product of Example I as the antioxidant, a second stock contained the condensation product of Example II as the antioxidant, a third stock contained phenyl β-naphthylamine as the antioxidant and a fourth stock contained no antioxidant.

To test for staining, test pieces of each of the cured white sidewall rubber stocks were placed between white lacquered and white enameled refrigerator panels for 96 hours at 80° C. at a constant pressure of 1 pound per square inch.

To test for discoloring, test pieces of each of the cured white sidewall rubber stocks were exposed to a standard RS sunlamp at a distance of 8 inches for 24 hours. In the table below, the larger the numerical value the greater the staining and discoloring; lower numerical values indicate better deterioration retarder quality.

Table III.—Staining and discoloring

| Stock Containing | Staining | Discoloring |
|---|---|---|
| No Antioxidant.................................. | 2 | 2 |
| Condensation Product—Example I........ | 2 | 2 |
| Condensation Product—Example II....... | 2 | 2 |
| Phenyl β-naphthylamine...................... | 4 | 8 |

These results show that each condensation product of Example I and of Example II do not contribute to the staining or discoloring of the white sidewall rubber stocks, that is, each is a non-staining and a non-discoloring deterioration retarder, in contrast to phenyl β-naphthylamine which is definitely both a staining and a discoloring age-resister.

EXAMPLE III

A reaction flask was charged with about 21.4 g. (0.1 mol) of 1,1-bis(3-methyl-4-hydroxy phenyl)cyclohexane, 11.6 g. (0.2 mol) of acetone, 100 cc. of concentrated hydrochloric acid (37% HCl) and 3 g. of β-mercaptopropionic acid. The mixture was slowly heated, while stirring, to 56° C. and stirring was continued for about 3 hours at that temperature. During the reaction period, the reaction mixture changed in appearance, a yellow color developed, solid particles were formed which increased in size as the reaction continued. The solid was filtered out, washed free from acid and dried, yielding a pelleted buff-colored resin. When tested for age-resisting, non-staining and non-discoloring properties, the reaction product exhibited substantially the same excellent properties as did the reaction products of Examples I and II.

A number of other combinations of bis(3-methyl-4-hydroxy phenyl)alkanes and ketones have been found to follow the pattern of the above examples in producing novel resinous condensation products which are excellent age-resisting, non-staining and non-discoloring antioxidants. Thus the reaction product of 1,1-bis(3-methyl-4-hydroxy phenyl)cyclohexane and cyclohexanone is a hard, brittle resinous material. When these and other similar condensation products are employed in rubber compositions, whether of natural or synthetic rubber, similar excellent results are obtained in the protection of both unvulcanized and vulcanized rubber and rubber compositions.

Products stabilized with the condensation products of this invention are extremely useful not only in white or light-colored rubber compositions but also in other rubber compositions that have service contact with white or light-colored rubber compositions or with other materials susceptible of staining on service contact.

While the invention of this application has been illustrated by means of a few specific examples, it is to be understood that the invention is not limited thereto, but that other reactants within the range herein indicated and their equivalents may be employed, where desirable, and that modifications in proportions of reactants and in amounts employed in rubber and rubber compositions, may be employed, without departing from the spirit and scope of this invention as defined in the appended claims.

What is claimed is:

1. A rubbery composition comprising a rubbery diolefinic polymer in which is dispersed from 0.1 to 10 parts by weight on the rubbery diolefinic polymer of a substantially non-staining, non-discoloring highly effective oxygen-resisting resinous deterioration retarder obtained by the polycondensation reaction between one mol of a bis(3-methyl-4-hydroxyphenyl)alkane, in which the alkane group is selected from the class consisting of propane and cyclohexane groups, and from one to two mols of a ketone selected from the class consisting of acetone and cyclohexanone, the hydrocarbon nucleus of each ketone molecule being attached to a carbon atom of a phenyl group of the bis(3-methyl-4-hydroxyphenyl)alkane in a position ortho to a hydroxy group.

2. A rubbery composition comprising a rubbery diolefinic polymer in which is dispersed from 0.1 to 10 parts by weight on the rubbery diolefinic polymer of a substantially non-staining, non-discoloring highly effective oxygen-resisting deterioration retarder obtained by the polycondensation reaction between one mol of 2,2-bis(3-methyl-4-hydroxyphenyl)propane and from one to two mols of acetone, the hydrocarbon nucleus of each ketone molecule being attached to a carbon atom of a phenyl group of the bis(3-methyl-4-hydroxyphenyl)propane in a position ortho to a hydroxy group.

3. A sulfur-vulcanized rubbery composition comprising a sulfur-vulcanized rubbery diolefinic polymer in which is dispersed from 0.1 to 10 parts by weight on the diolefinic polymer of a substantially non-staining, non-discoloring highly efficient oxygen-resisting deterioration retarder obtained by the polycondensation reaction between one mol of a bis(3-methyl-4-hydroxyphenyl)alkane, in which the alkane group is selected from the class consisting of propane and cyclohexane groups, and from one to two mols of a ketone selected from the class consisting of acetone and cyclohexanone, the hydrocarbon nucleus of each ketone molecule being attached to a carbon atom of a phenyl group of the bis(3-methyl-4-hydroxyphenyl)alkane in a poition ortho to a hydroxy group.

4. A sulfur-vulcanized rubbery composition comprising a sulfur-vulcanized rubbery diolefinic polymer in which is dispersed from 0.1 to 10 parts by weight on the rubbery diolefinic polymer of a substantially non-staining, non-discoloring highly efficient oxygen-resisting deterioration retarder obtained by the polycondensation reaction between one mol of 2,2-bis(3-methyl-4-hydroxyphenyl)propane and from one to two mols of acetone, the hydrocarbon nucleus of each ketone molecule being attached to a carbon atom of a phenyl group of the 2,2-bis(3-methyl-4-hydroxyphenyl)propane in a position ortho to a hydroxy group.

5. A rubbery composition comprising a rubbery diolefinic polymer in which is dispersed, as a substantially non-staining non-discoloring highly efficient oxygen-resisting deterioration retarder therefor, from 0.1 to 10 parts by weight on the rubbery diolefinic polymer of the solid resin resulting from the polycondensation reaction between one mol of 1,1-bis(3-methyl-4-hydroxyphenyl)cyclohexane and from one to two mols of acetone.

6. A rubbery composition comprising a rubbery diolefinic polymer in which is dispersed, as a substantially non-staining non-discoloring highly efficient oxygen-resisting deterioration retarder therefor, from 0.1 to 10 parts by weight on the rubbery diolefinic polymer of the solid resin resulting from the polycondensation reaction between one mol of 1,1-bis(3-methyl-4-hydroxyphenyl)cyclohexane and from one to two mols of cyclohexanone.

7. A sulfur-vulcanized rubbery composition comprising a rubbery diolefinic polymer in which is dispersed, as a substantially non-staining non-discoloring highly efficient oxygen-resisting deterioration retarder therefor, from 0.1 to 10 parts by weight on the rubbery diolefinic polymer of the solid resin resulting from the polycondensation reaction between one mol of 1,1-bis(3-methyl-4-hydroxyphenyl)cyclohexane and from one to two mols of acetone.

8. A sulfur-vulcanized rubbery composition comprising a rubbery diolefinic polymer in which is dispersed, as a substantially non-staining non-discoloring highly efficient oxygen-resisting deterioration retarder therefor, from 0.1 to 10 parts by weight on the rubbery diolefinic polymer of the solid resin resulting from the polycondensation reaction between one mol of 1,1-bis(3-methyl-4-hydroxyphenyl)cyclohexane and from one to two mols of cyclohexanone.

References Cited in the file of this patent

UNITED STATES PATENTS

| Number | Name | Date |
|---|---|---|
| 2,515,906 | Stevens et al. | July 18, 1950 |
| 2,628,212 | Young | Feb. 10, 1953 |
| 2,668,161 | Beaver | Feb. 2, 1954 |
| 2,669,588 | Deming et al. | Feb. 16, 1954 |
| 2,670,340 | Kehe | Feb. 23, 1954 |
| 2,716,096 | Young | Aug. 23, 1955 |
| 2,731,443 | Forman | Jan. 17, 1956 |
| 2,745,726 | Young | May 15, 1956 |

OTHER REFERENCES

Angewandte Chemie 68, No. 20, 633–640, Schnell, October 21, 1956.